United States Patent [19]

Hemmady et al.

[11] Patent Number: 5,363,369

[45] Date of Patent: Nov. 8, 1994

[54] SYSTEM FOR INTER PACKET COMMUNITY COMMUNICATION

[75] Inventors: Jayant G. Hemmady, Naperville; Craig P. Reilly, Carol Stream; Neil J. Romy, Lisle; Ronald A. Spanke, Wheaton, all of Ill.

[73] Assignee: AT&T Bell Laboratories, Murray Hill, N.J.

[21] Appl. No.: 40,818

[22] Filed: Mar. 31, 1993

[51] Int. Cl.$^5$ ............................................. H04Q 11/04
[52] U.S. Cl. .................... 370/60; 370/85.13; 370/85.14; 370/94.1; 379/59; 379/60; 455/33.1; 455/33.2
[58] Field of Search .............. 370/79, 85.13, 85.14, 370/60, 94.1; 379/59, 60; 455/33.1, 33.2

[56] References Cited

U.S. PATENT DOCUMENTS

| | | | |
|---|---|---|---|
| 4,777,646 | 10/1988 | Harris | 379/59 X |
| 4,887,265 | 12/1989 | Felix | 370/94.1 |
| 4,975,906 | 12/1990 | Takiyasu et al. | 370/85.13 |
| 5,136,584 | 8/1992 | Hedlund | 370/94.1 |
| 5,144,622 | 9/1992 | Takiyasu et al. | 370/85.13 |
| 5,301,273 | 4/1994 | Konishi | 370/85.13 |

Primary Examiner—Douglas W. Olms
Assistant Examiner—Russell W. Blum
Attorney, Agent, or Firm—Michael B. Johannesen

[57] ABSTRACT

A system for delivering packetized data in a network comprising a plurality of packet switch communities, wherein each of the packet switch communities has a plurality of endpoints connected to a common packet switch and having a unique address, and wherein each of the endpoints has addresses unique to their respective packet switch community. The endpoints in this system add a two-part destination address to the packetized data to be sent, wherein the first field represents a packet switch community and the second represents a destination endpoint. Each packet switch community is responsive to the first field being different from its own address for delivering the packetized data to a switch. The switch is responsive to the first field for delivering the packetized data to a packet switch community identified by the first field. Finally, each endpoint in the destination packet switch community is responsive to the first and second address fields for accepting packetized data.

32 Claims, 6 Drawing Sheets

SYSTEM FOR INTER PACKET COMMUNITY COMMUNICATION

CROSS-REFERENCE TO RELATED APPLICATION

This application is related to U.S. patent application Ser. No. 08/040,819 entitled "Packet Switch to Provide Code Division, Multiple Access Cellular Service," filed concurrently with this application.

TECHNICAL FIELD

This invention relates to the field of packet communication, and, more specifically, to the field of inter-packet community communication.

BACKGROUND OF THE INVENTION

Packet communication between two endpoints in different packet communities has been the topic of much research and patent activity. For purposes of this patent, "packet communities" are any set of systems that communicate with each other by packets. A packet switch or a local area network (LAN) are just two examples of "packet communities." An "endpoint" is a device on a packet switch or a node on a LAN that is a source or destination of packet traffic. Communication between two endpoints in different packet communities is therefore sending packets between one device connected to a first packet switch (or one node on a first LAN) to a second device on a different packet switch (a second node on a second LAN).

The disclosure of U.S. Pat. No. 5,144,622, which issued in the name of Takiyasu, et al., on Sep. 1, 1992, (herein Takiyasu) describes a system for interconnecting LANs to provide packet communication from a node on a first LAN to a node on a second LAN. In this system, a packet sent from a source node on a first LAN is received at a LAN interconnection switching unit, which is also on the LAN. The LAN interconnection switching unit determines that the destination for the packet is not on the LAN, and places the packet in memory. The LAN interconnection switching unit performs a search of its own records of routing information to determine a route for the packets. The LAN interconnection switching unit then sends a call set up message to all LAN interconnection switching units in the path to the destination LAN to alert them of the pending transmission. The LAN interconnection switching unit then transmits the packets to the destination LAN via the intermediate LAN interconnection switching units. The destination LAN interconnection switching unit receives the packets and sends the packets out on the second LAN.

The system of Takiyasu, while sufficient for some purposes, is weak in two basic arc as. First, the system requires that each of the LAN interconnection switching units has all of the routing table information for the entire interconnected system. These tables are hard to maintain because they all have to be changed whenever any alteration of the network occurs. Second, the system is slow in delivering the initial several packets, for at least the time it takes to calculate a route and send the routing message through the network by the calculated route.

Therefore, a problem in the art is a lack of fast, easy to maintain inter-packet community packet communication system.

SUMMARY OF THE INVENTION

This problem is solved and a technical advance is achieved in the art by a system that delivers packets from a source on a first packet switch community to a destination on a second packet switch community by a routing system that is set up before packet transmission occurs and can be changed easily, thus facilitating rapid packet communication. This invention provides a system for delivering packetized data in a network comprising a plurality of packet switch communities, wherein each of the packet switch communities has a unique address, and a plurality of endpoints connected to a common packet switch, wherein each of the endpoints has an address unique within its respective packet switch community. The endpoints in this system add a destination address to the packetized data to be sent, wherein the destination address has a first field representing a packet switch community address and a second field representing a destination endpoint address within the packet switch community. The packet switch community is responsive to the first field being different from its own address for delivering the packetized data to a switch. The switch is responsive to the first field for delivering the packetized data to a packet switch community identified by the first field. Each packet switch community receives packetized data and delivers it to the endpoints in its community. Finally, each endpoint is responsive to the first and second address fields for accepting packetized data, wherein only an endpoint in a packet switch community having an address corresponding to the first address field and having an address corresponding to the second address field accepts the packetized data.

BRIEF DESCRIPTION OF THE DRAWING

A more complete understanding of the invention may be obtained from consideration of the following description in conjunction with the drawings in which.

DETAILED DESCRIPTION

Figure 1:
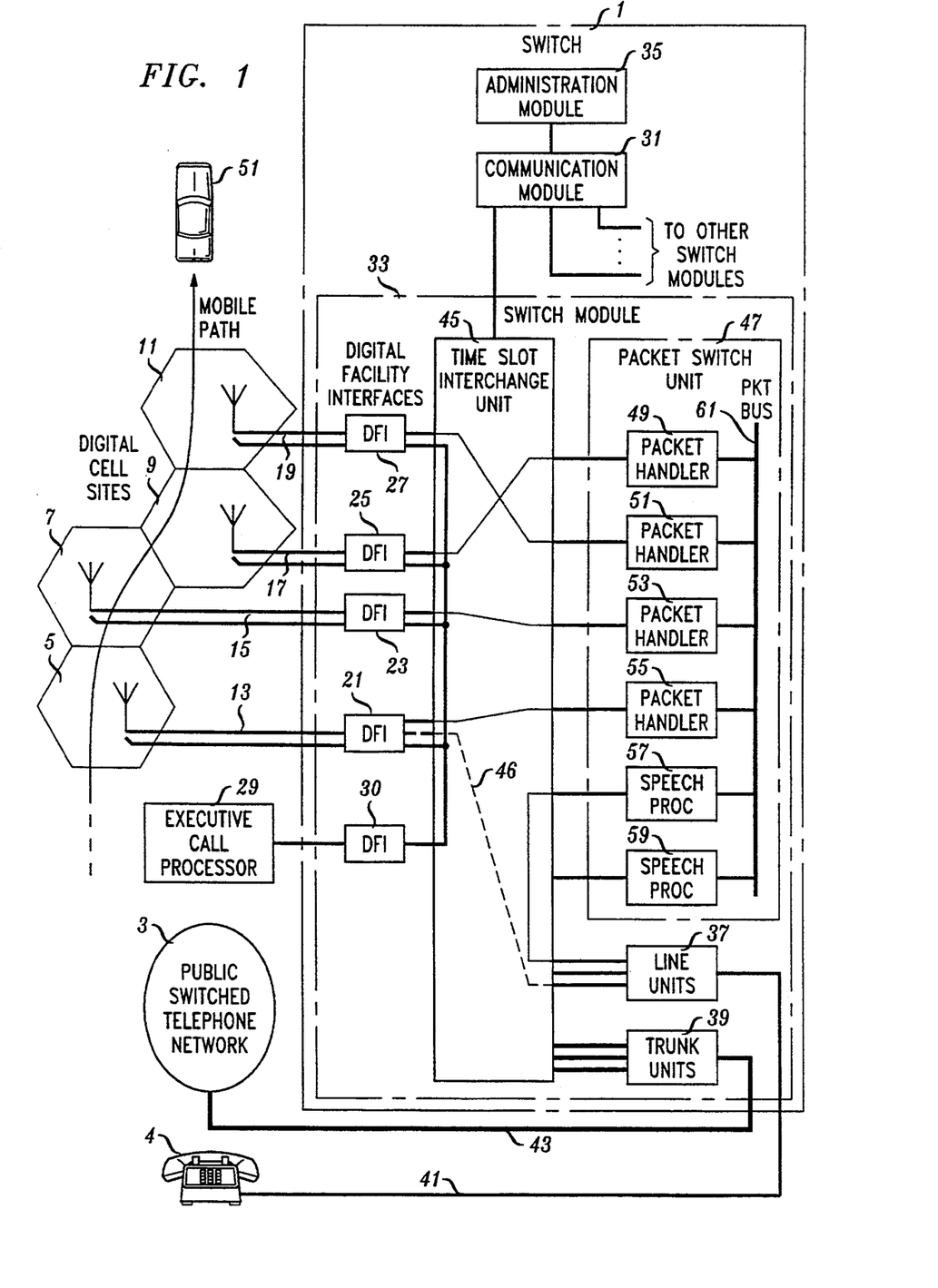
FIG. 1 is a block diagram of a mobile telephone switching system showing a packet switch distributing digital packets to speech processors according to an exemplary embodiment of this invention.

An exemplary embodiment of a self-routing mechanism to deliver packets between a cell site and a public switch telephone network interface is described here in the context of a mobile telephone switching system, as illustrated in FIG. 1, having a central office switch 1, which is connected to a public switched telephone network 3, a telephone 4, and a plurality of digital cell sites 5-11. Digital cell sites 5-11 send and receive digital signals and translate these signals to/from a packetized stream. Digital cell sites 5-11 are connected to switch 1 via a plurality of trunks 13-19, connected to an equal number of digital facility interfaces (DFI) 21-27 at switch module (SM) 33 of switch 1. DFIs 21-27 provide termination of the digital trunks to and from cell sites 5-11, as is known in the art, and therefore, will not be discussed further. Executive Call Processor (ECP) network 29 connects to switch 1 and cell site 5-11 for exchange of control data via DFI 30, as is known in the art, and described in the Bell System Technical Journal, Vol. 58, No. 1, January, 1979.

Switch 1 is, illustratively, a distributed control, ISDN electronic telephone system, such as the system disclosed in U.S. Pat. No. 4,592,048, issued to M. W. Beckner, et al., on May 27, 1986. Alternatively, switch 1 may be a distributed control digital switch such as a 5ESS ® switch manufactured by AT&T and described in the AT&T Technical Journal, Vol. 64, No. 6, July/August, 1985, pages 1303-1564. The architecture of switch 1 includes communication module 31 as a hub, with switching module 33, other switching modules (not shown for clarity) and administrative module 35 emanating therefrom. Switching module 33 terminates analog and/or digital subscriber lines through line unit such as line unit 37, and analog or digital trunks through trunk units, such as trunk unit 39. Line unit 37 provides communication with telephone 4 via line 41. Trunk unit 39 provides communication with public switch telephone network 3 via trunks 43. Administrative module 35 provides coordination of the functional components of switch 1 and human/machine interface.

Switch module 33 includes a timeslot interchange unit (TSIU) 45 and packet switch unit 47. TSIU 45 provides interchange of 64 Kbps PCM or 64 Kbps clear channel among the units in switch module 33. Switch module 33 may also contain other units but, for purpose of clarity, these other units are not shown.

Packet switch unit (PSU) 47, according to an exemplary embodiment of this invention, includes packet handlers 49-55 and speech processors 57 and 59, which are all connected to a means for transporting packets, which in this exemplary embodiment is packet bus 61. Packet handlers 49-55 and speech processors 57 and 59 are known in the art as packet bus "endpoints." Other endpoints performing similar (or dissimilar) functions may also be connected to packet bus 61, but are not shown for clarity for purposes of describing this exemplary embodiment of this invention. PSU 47 makes up a packet switch community, that is, a packet bus and its associated endpoints. Packet handlers 49-55 perform a frame relay function: receiving packets from cell sites, adding a two-part address, and relaying the packets onto packet bus 61, as will be explained further, below. Speech processors 57 and 59 determine which packets have their two-part address (as will be defined below), receive them, and translate the packets into switchable 64 Kbps PCM. In the reverse direction, speech processors 57 and 59 also receive 64 Kbps PCM, translate it into packets, add a two-part address, and send the packets out onto packet bus 61.

In the prior art, a digital call between a mobile telephone, for example, in car 51, and telephone 4 (or PSTN 3), originates in, for example, cell 5. The speech from the mobile user is encoded using digital technology at mobile 51 and transmitted to cell site 5 over the radio spectrum. According to the teaching of the prior art, a digital speech processor located at cell site 5 translates from digital into the 64 Kbps PCM stream switchable by switch module 33. A circuit switched path connection through DFI 21 to TSIU 45, as represented by broken line 46, is established that interconnects the translated speech signal with line unit 37, for example, and to telephone 4. As mobile 51 moves from cell 5 into cell 7, another speech processor at cell 7 performs the translation and TSIU path 46 must be torn down and then set up to DFI 23. As mobile 51 continues through cell sites 9 and 11, further rearrangements of TSIU 43 paths are necessary.

According to the exemplary embodiment of this invention, mobile telephone 51 initiates a digital call in cell 5. In this exemplary embodiment, there is no speech processor in cell 5; instead, there are one or more (2 in this example) speech processors 57, 59, connected to packet bus 61 in packet switch unit 47. The digital call is set up between mobile 51 and cell site 5, as before. A speech processor, 57 in this example, at switch 1 is assigned to the call and the unique two-part address is given to cell site 5 that describes speech processor 57, as will be described below, in connection with FIG. 3.

As signals arrive at cell site 5, they are packetized and the unique two-part address is added to it. The packets are multiplexed (with packets from other CDMA calls) into packet pipes, which are themselves multiplexed and sent over trunk 13. DFI 21 receives the multiplexed trunk, demultiplexes the packet pipes and sends the packet pipes to packet handler 55 on a path through TSIU 45 that is semi-permanently set up ("nailed up") between DFI 21 and packet handler 55. As the packets come in through TSIU 45 to packet handler 55, packets are demultiplexed from the packet pipes and placed on packet bus 61. Packets are then received by, for example, speech processor 57. Speech processor 57 accepts ("picks") all packets where the two-part address includes its packet community and unit number, and performs the conversion to 64 Kbps PCM. Speech processor 57 is connected through TSIU 45 to line unit 37 and to telephone 4 (alternatively through trunk unit 39 to PSTN 3).

Speech (or data) from telephone 4 (PSTN 3) to mobile 51 moves through line unit 37 (trunk unit 39), where it is carded as 64 Kbps streams and sent through TSIU 45 and into speech processor 57. Speech processor 57 keeps a record of which cell site is the source of incoming packets, including a unique two-part address of packet handler 55 associated with cell site 5 in communication with destination mobile 51, and uses that source address as the destination two-part address for the outgoing packets. Speech processor 57 translates the 64 Kbps packets into packets, adds the destination two-part address of packet handler 55 and sends them on packet bus 61. Packet handler 55 recognizes its own address in the packets on packet bus 61, multiplexes the packets (with packets from other CDMA calls) in packet pipes and sends them through TSIU 45 to DFI 21. DFI 21 multiplexes a plurality of packet pipes, and sends them to cell site 5 via trunk 13. Cell site 5 demultiplexes the stream on the trunk and then demultiplexes the packet pipes, and transmits a digital signal to mobile 51.

As mobile 51 approaches the boundary between two cells, for example cell sites 5 and 7, mobile 51 in conjunction with cell site 5 determines that the call needs to be handed off to cell site 7, according to its protocol. Cell site 7 is informed of the two-part address of the speech processor associated with the call, in this example, speech processor 57. Cell site 7 then receives a digital signal from mobile 51 and also begins to send packets to speech processor 57 through DFI 23, via a nailed-up connection through TSI 45 to packet handler 55, which places these packets on packet bus 61.

Speech processor 57 then receives two packets containing basically identical data from two different cells. Since the destination address is the same, speech processor 57 compares signal strength, as encoded into each packet via the digital process, processes the packet with the stronger signal strength, and ignores the other packet. As stated above, speech processor 57 records the two-part address of the packet handler connected to the cell or cells that are sending packets and, therefore, it sends identical packets in return to all of the cells transmitting to it.

Ultimately, the signal strength at cell site 5 will fall below a threshold, and speech processor 57 will receive packets with a very low signal strength from cell site 5. Cell site 5 is then requested to remove itself from the call. Cell site 5 informs speech processor 57 that it is removing itself from the call, and speech processor 57 removes the address of packet handler 55 of cell site 5 from its list. During the time that these events are occurring between the cell sites and the speech processor, only one connection is established from a cell site to its associated packet handler, and only one connection is established from speech processor 57 through to telephone 4 (or public switch telephone network 3), and no hard handoff occurs as mobile 51 moves through the digital cell sites.

Figure 2:
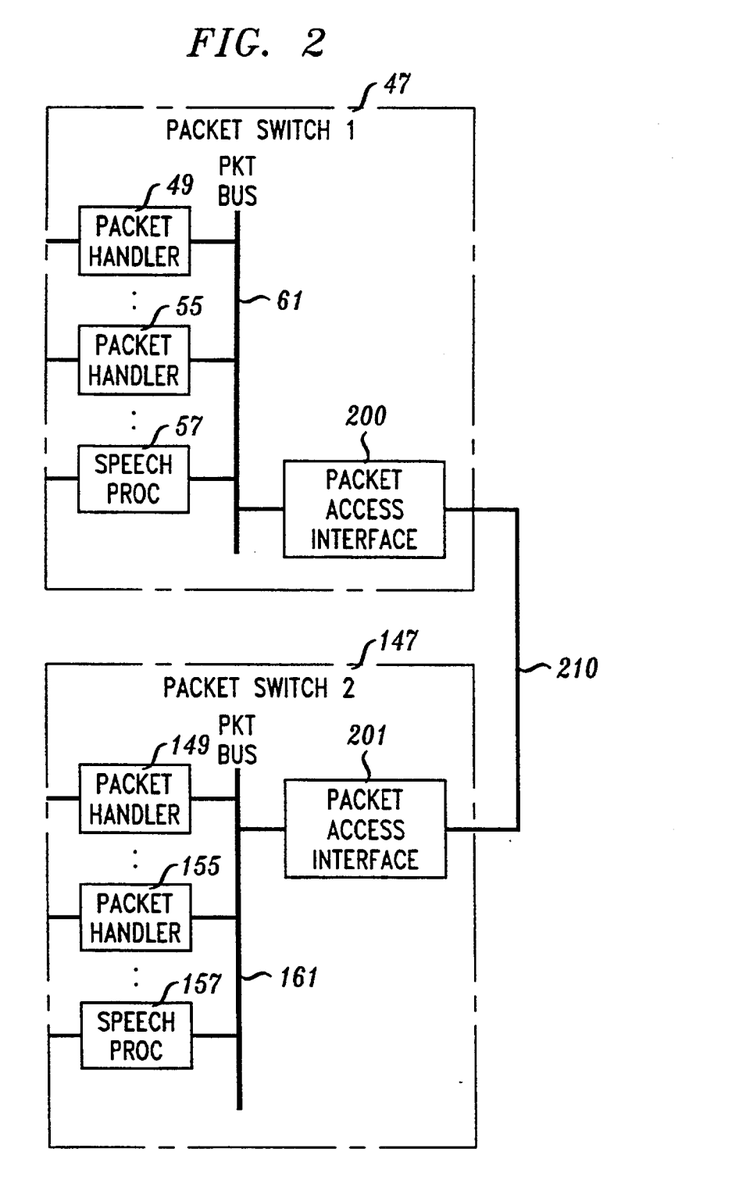
FIG. 2 is a block diagram of two packet switches distributing digital packets according to one aspect of this invention, wherein the packet switches are directly connected to each other by packet access interfaces connected to an asynchronous transfer mode (ATM) link.

FIG. 2 extends the network of FIG. 1 according to a further aspect of this invention. Packet switch unit 147 in switch 2 may be in another switch module in the same switch module as packet switch 1. Alternatively, packet switch unit 147 in switch 2 may be connected to other switches, if, for example, packet switch unit 147 in packet switch 2 is in another switch from packet switch unit 47 in packet switch 1. This extends the range of the mobile network by permitting packet handlers, for example 149 and 155 in packet switch 147, to communicate with speech processor 57 in packet switch 47 (in SM 33 of original switch 1) via a packet transport network.

Inter-packet switch communication is facilitated via packet access interfaces 200, 201, using an address community-match system. Packet access interface (PAI) 201 examines all packets from packet bus 161, determines that the packets are addressed for an external destination (such as speech processor 57 on packet bus 61), by examining the first field of the destination address and concluding that the community address matches the packet switch community number of packet switch 47 to which it is connected. PAI 201 encapsulates the packets with transport protocol data and sends it out on a transfer bus 210. In the exemplary embodiment of this invention, asynchronous transfer mode (ATM) communication is the preferred packet transport network. Other means for establishing a packet transport network, for example, ETHERNET, may be used without departing from the scope of this invention.

For this exemplary embodiment of this invention, if PAI 201 receives packets from packet bus 161 that it recognizes are addressed to a speech processor connected to packet bus 61, it stores them in an internal memory. Since packets on packet bus 161 may be of variable lengths (for example, the packet would be very short if there were silence being communicated or alternatively may be very long if data are being communicated), PAI 201 breaks the packets into a fixed length cell so that it may be encapsulated with the proper protocol for ATM and then shipped out on ATM link 210.

PAI 200 receives packets from ATM 210, strips off the encapsulation protocol data, and, if necessary, reassembles the packets into the original length. PAI 200 then places the packet on packet bus 61, speech processor 57 recognizes its own address, takes the packet off of packet bus 61 and processes it as stated above.

Figure 3:
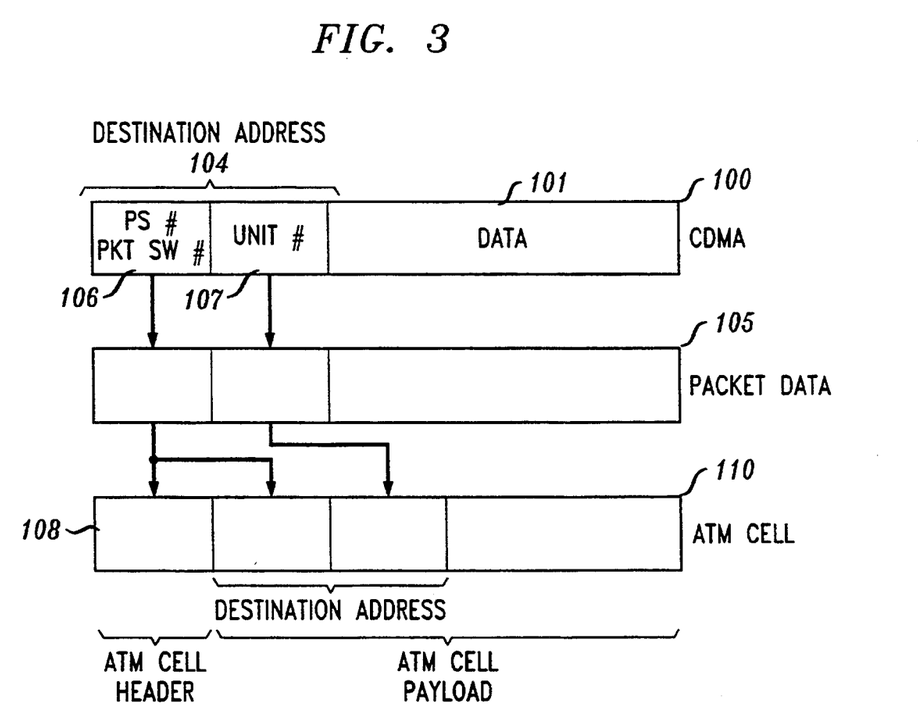
FIG. 3 is a block diagram of a packet addressing system according to one aspect of this invention.

FIG. 3 is a block diagram of a packet addressing system according to an exemplary embodiment of this invention, as applied to the embodiment of FIGS. 1 and 2. Packet 100 comprises a message as it is received at a packet handler, such as packet handler 55 from cell site 5. Packet 100 includes a data portion 101 for the digitally encoded information, and a destination address 104. Destination address 104 comprises two fields, a destination packet switch number (also called "packet community 106"), and a unit number 107 designating an endpoint within the packet community. This address is assigned via the ECP 29 during call setup, and propagated throughout the cellular system as mobile 51 (FIG. 1) moves from cell to cell, as described above.

In the embodiment of FIG. 1, packet handler 55 adds whatever protocol is required by the packet community, if any, transforming digital packet 100 into packet data 105. In this example, packet switch number field 106 is the number of packet switch community 47; unit number field 107 is for the endpoint speech processor 57.

In the embodiment of FIG. 2, PAI 201 recognizes that the packet switch number field 106 of destination address 104 in packet 105 is addressed to packet switch 1. Therefore, PAI 201 removes packet 105 from packet bus 161 and encapsulates packet 105 into an ATM cell 110. This may include breaking the data 101 into multiple parts if the data portion 101 is too long for one ATM cell 110. PAI 201 then places the community address field into the VCI or VPI field of the ATM cell header 108 of ATM cell 110.

After PAI 201 delivers ATM cell 110 to PAI 200, PAI 200 removes the ATM transport layer to reassemble the data into packet 105 and sends it on bus 61. Speech processor 57 recognizes its destination endpoint number, and its packet community number, and receives packet 105. In this manner, packetized data may be sent throughout a connectionless transport system without delaying the initial packets. Furthermore, routing information does not have to be stored in every node handling the packet.

According to the teaching of the prior art, most packet bus addressing systems solely include the identification number or address of the destination endpoint. In such systems where there is no interconnection of packet switch communities, this addressing system is sufficient to uniquely identify a destination endpoint. Any other address fields are expected to be zero or null. In this embodiment of this invention, a two-part address has a first field representing the address of a destination packet switch community, so that the packet can be routed to the proper destination packet switch community. Once at the destination packet switch community, this field is not needed, and, in order to make this system transparent when used with prior art packet switches, unwanted. Therefore, the destination packet switch community address may be changed by the source PAI, the destination PAI, or the packet transport network connecting the two into a local address (usually zero or null). Advantageously, each destination endpoint recognizes both its local address and its packet switch community address along with its endpoint address. This facilitates delivery of packets when the source and destination endpoints are on the same packet switch community.

Figure 4:
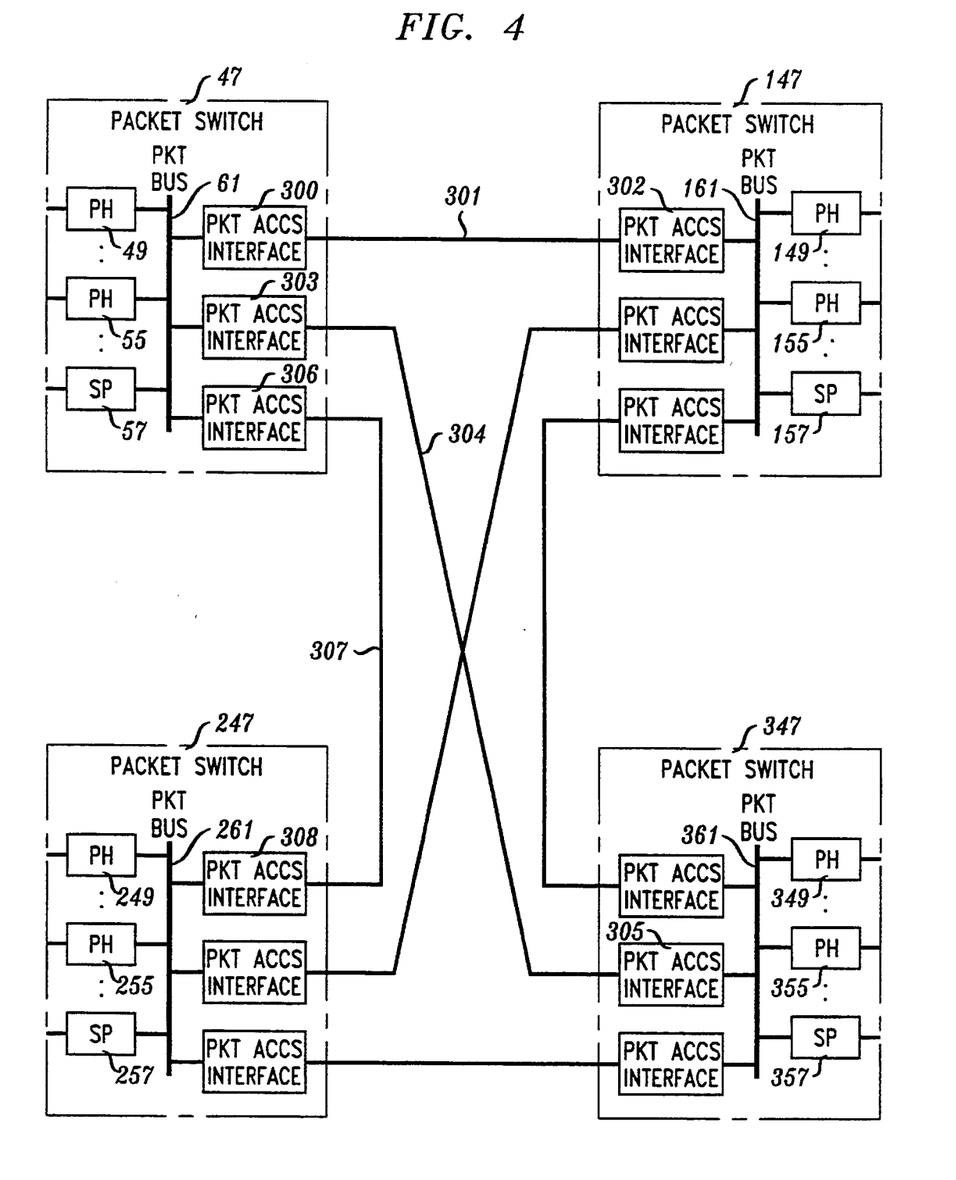
FIG. 4 is a block diagram of a plurality of packet switches fully point-to-point inter-connected by an ATM interface, according to another aspect of this invention.

A more complex interconnection of packet switches, according to another exemplary embodiment of this invention, is shown in FIG. 4. This configuration may be used to interconnect, for example, a plurality of packet switches in a plurality of different switch modules within a single switch. Also, this configuration may be used to connect switch modules of different switches. In this configuration, each packet switch is connected to all of the other packet switches via individual PAIs and ATM links. For example, packet switch 47 is connected to packet switch 147 via PAI 300, ATM link 301, and PAI 302. Likewise, packet switch 47 is connected to packet switch 347 via PAI 303, ATM link 304, and PAI 305 in packet switch 347. Finally, packet switch 47 is connected to packet switch 247 via PAI 306, ATM link 307, and PAI 308. Each packet switch is thus interconnected to every other packet switch via these connections.

In this configuration, PAI, for example, 308 in this embodiment, recognizes destination addresses (specific packet community number) associated with its destination packet switch. For example, PAI 308 recognizes the addresses of all endpoints in packet switch 47, including speech processor (SP) 57, by examining the community address field of all packets and matching on community address equal to 47. Therefore, a packet from packet handler (PH) 255 in packet switch 247 addressed to speech processor (SP) 57 in packet switch 47 is placed on packet bus 261. PAI 308 recognizes the community address associated with packet switch 47, accepts the packet, and performs encapsulation and protocol to place the packet on ATM bus 307 to PAI 306. PAI 306 reassembles the packet as needed, places it on packet bus 61, and speech processor 57 then receives the packet.

Figure 5:
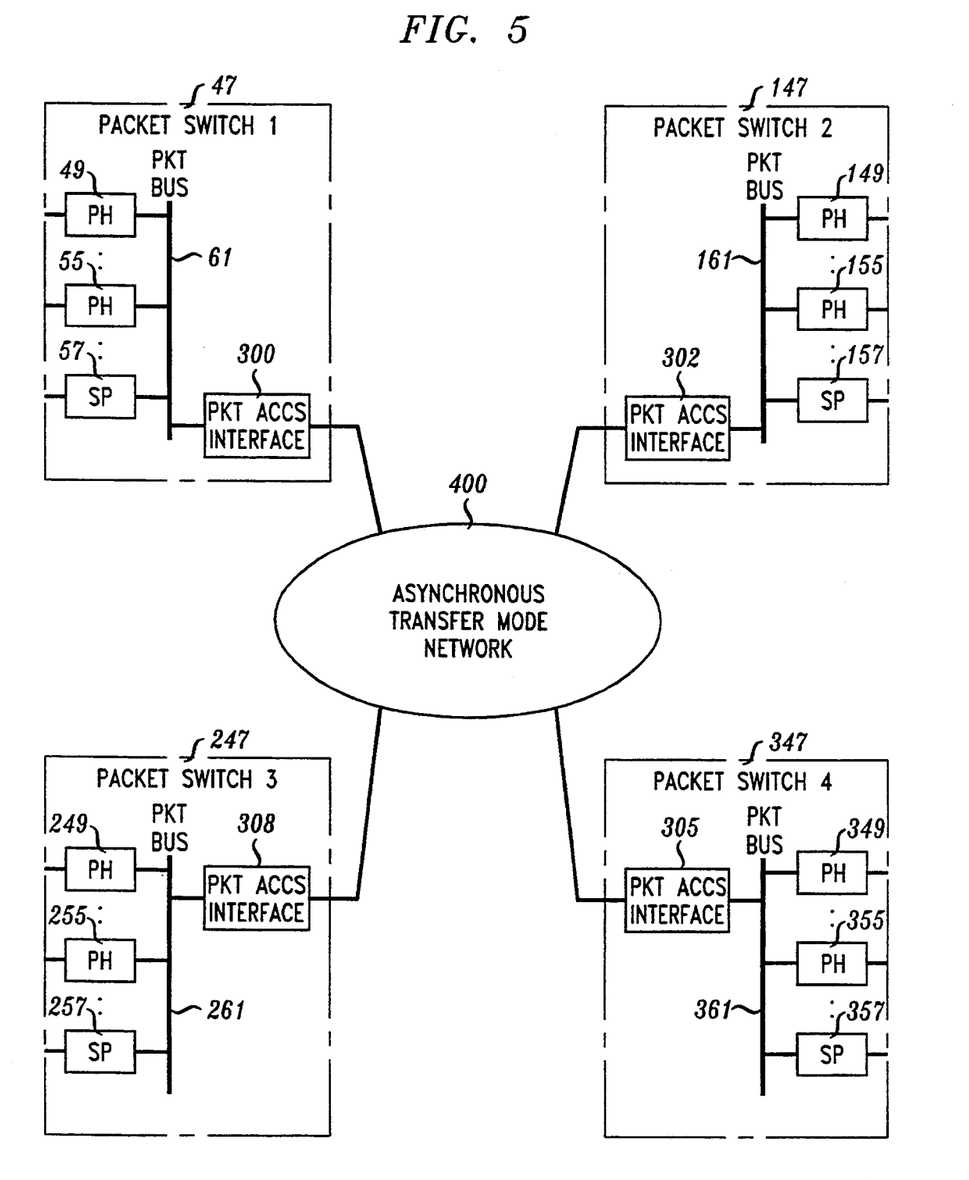
FIG. 5 is a block diagram of a plurality of packet switches connected to a self-routing switch element.

A further embodiment of this invention is presented in FIG. 5, wherein packet switches 47, 147, 247, and 347 are all interconnected via a switch element, which, in this exemplary embodiment is an asynchronous transfer mode (ATM) network 400. In this embodiment, any packet switch can send a message to packet switch 47, through the ATM network 400. A community mismatch system is used in this embodiment. Therefore, if packet handler (PH) 355, for example, in packet switch 347 receives a packet destined for speech processor (SP) 57 in packet switch 47, packet handler 355 puts the message on packet bus 361.

PAI 305 recognizes that packet community number (105 in FIG. 3) is not local to packet switch 347 (i.e., community mismatch routing). The packet is taken by PAI 305 from packet bus 361, PAI 305 encapsulates it with ATM protocol and uses a virtual path or virtual channel indicating the packet is destined for packet switch 47. It sends the ATM cell through the self-routing ATM network 400. ATM network 400 routes the ATM cell to the correct PAl, based on the virtual path or virtual channel number in the ATM cell 110 (FIG. 3). PAl 300 receives a cell or cells that were destined for endpoints on packet bus 61. PAI 300 reassembles them into the original packet 105, and puts them on packet bus 61. Speech processor 57 recognizes its own address in the packet on bus 61 and performs translations as described above. In this manner, any number of packet switches may be connected to the ATM network, and the ATM network is not limited to handling digital packet switching, as it may route packets from other applications.

Figure 6:
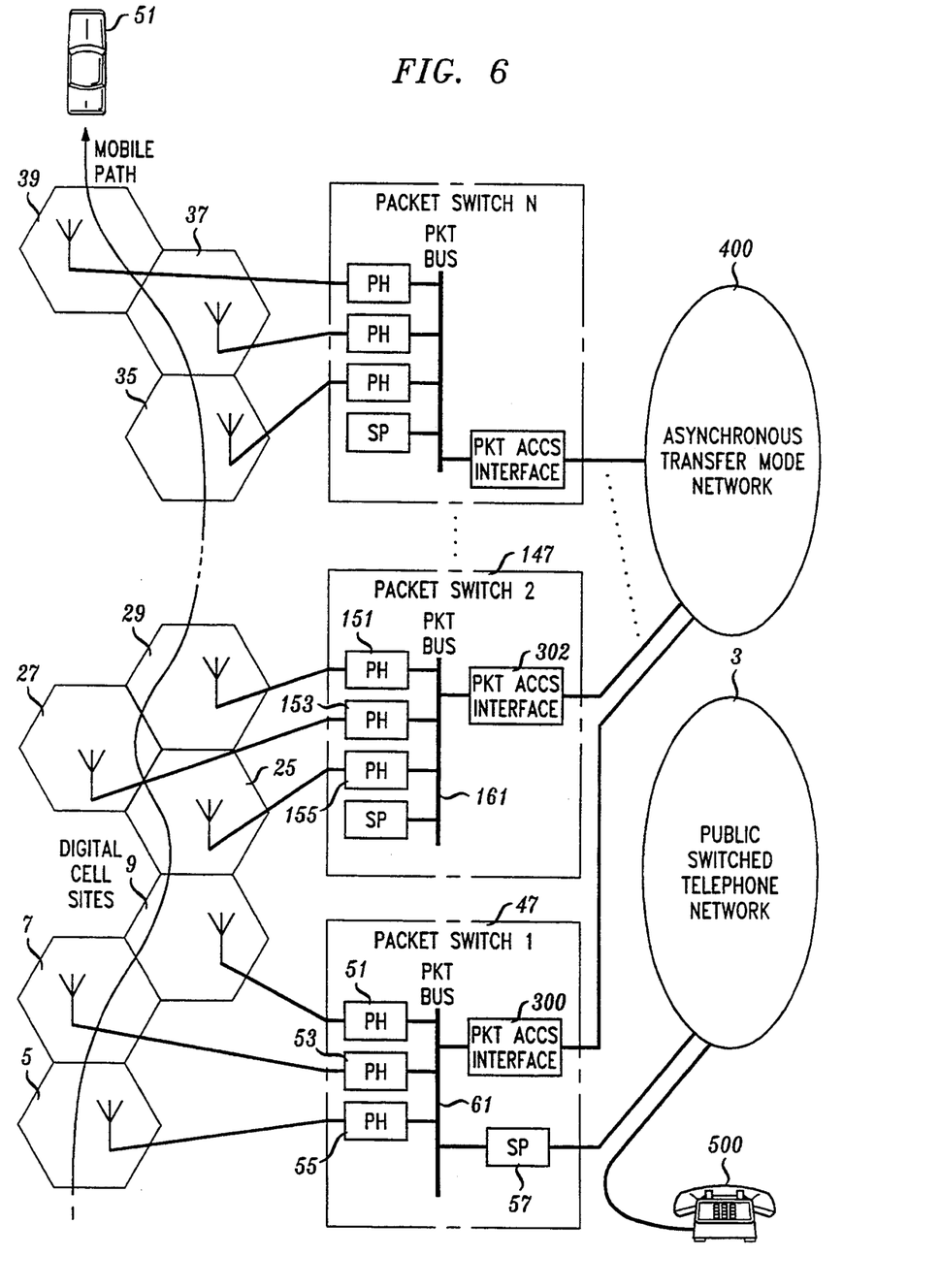
FIG. 6 is an exemplary embodiment of a digital mobile telephone communication network wherein a plurality of switches within a metropolitan area are connected to each other via a self-routing switch element.

FIG. 6 applies the embodiment of FIG. 5 to wide area packet switching of digital mobile telephone communications. In this exemplary embodiment, mobile telephone 51 initiates a call to telephone 500 when it is in cell 5, connected to packet switch 47. Packet handler (PH) 55 receives packets from cell 5 and sends them on bus 61 to speech processor 57 which connects to PSTN 3 and to telephone 500. As mobile 51 moves from cell 5 to cell 7, ECP network (not shown for clarity in this figure, but shown as 29 in FIG. 1) informs cell site 7 of the speech processor (SP) 57 handling the call. As mobile 51 moves into cells 7 and 9, packet handlers 53 and 51, respectively, send packets on bus 61 to speech processor 57. Speech processor 57 continues to be the only connection to PSTN network 3 and telephone 500 for this call.

Mobile 51 then moves from cell 9 into adjoining cell 25, which is serviced by packet handler 155, in packet switch 147. Cell 25 sends packets to packet handler 155, which places them on packet bus 161. PAI 302 recognizes that the address is not for a member of the packet bus 161 community, encapsulates the packets in ATM protocol as described above with a VCI or VPI indicating the destination community, and sends them through self-routing ATM network 400 (switch element). Self-routing ATM network 400 examines the VPI or VCI fields and routes the cells to the appropriate PAI. Cells with VPIs or VCIs destined for packet bus 61 are routed to PAI 300.

Encapsulated packets arrive at PAI 300 in packet switch 47, and are reassembled and put on packet bus 61 to speech processor 57. Similarly, mobile 51 may move through cells 35, 37, 39, and all intervening cells, since all of the packet switches are connected to ATM network 400. Thus, the call from SP 57 through PSTN 3 into telephone 500 does not have to be torn down as mobile 51 crosses cell and switch boundaries. Therefore, no hard handoff ever takes place throughout the entire network of switches connected to ATM network 400. An entire metropolitan area may be connected in this manner with all cellular switches connected to one ATM network. If this network were in metropolitan Chicago, for example, cell 5 could be in Kankakee in the far south, cell 39 could be in Zion in the far north, and mobile 51 could traverse the entire area without encountering a hard handoff.

It is to be understood that the above-described embodiment is merely an illustrative principal of the invention and that many variations may be devised by those skilled in the art without departing from the scope of the invention. It is, therefore, intended that variations such as this be included within the scope of the claims.

We claim:

1. In a network comprising a plurality of packet switch communities, each of said packet switch communities having a plurality of endpoints connected to a means for transporting packets among said endpoints, each of said packet switch communities having a unique address and each of said endpoints in said packet switch communities having an address unique within its packet switch community, a connectionless system for delivering packetized data from one endpoint to another endpoint responsive to a destination address comprising a first field representing a packet switch community address and a second field representing a destination endpoint address within that packet switch community, said system comprising:

means at each of said endpoints for sending said packetized data to its transporting means, said packetized data including said destination address;

means at each of said packet switch communities responsive to said first field of said destination address for offering said packetized data to a switching means;

switching means responsive to said first field for delivering said packetized data to a packet switch community identified by said first field;

means at each of said packet switch communities for receiving said packetized data from said switching means and offering said packetized data to said endpoints; and     means at said endpoints responsive to said first and second address fields for accepting said packetized data, wherein only an endpoint in a packet switch community identified by said first address field having an address corresponding to said address in said second address field accepts said packetized data.

2. A system according to claim 1 wherein said switching means comprises a packet transport network.

3. A system according to claim 2 wherein said switching means comprises an asynchronous transport mode network.

4. A system according to claim 1 wherein said means for offering said packetized data to said switching means comprises one of said plurality of endpoints.

5. A system according to claim 1 wherein said means for offering said packetized data to said switching means includes means for encapsulating said packetized data into a form suitable for said switching means, and said means for receiving said packetized data from said switching means includes means for restoring said packetized data.

6. A system according to claim 1 wherein said means at each of said packet switch communities for offering said packetized data to said switching means includes addressing means for transforming said destination address into a network address.

7. A system according to claim 1 wherein said means at each of said packet switch communities responsive to said first field of said destination address is responsive to said first field being different from an address of its own packet community.

8. A system according to claim 1 wherein said means at each of said packet switch communities responsive to said first field of said destination address is responsive to said first field being the same as a preselected packet switch community addresses.

9. A system according to claim 1 wherein said means at said endpoints for accepting said packetized data is responsive to said first field having an address corresponding to the address of its packet switch community when accepting packets from a different packet switch community, and responsive to said first field having a local address when accepting packets from its own packet switch community.

10. A system according to claim 1 wherein said means at said endpoints for accepting said packetized data is responsive to said first field having a local address, and wherein said receiving means translates said address in said first field into said local address.

11. A system according to claim 1 wherein said means at said endpoints for accepting said packetized data is responsive to said first field having a local address, and wherein said switching means translates said address in said first field into said local address.

12. A system according to claim 1 wherein said means at said endpoints for accepting said packetized data is responsive to said first field having a local address, and wherein said offering means translates said address in said first field into said local address.

13. A system according to claim 1 wherein said endpoints at at least one of said packet switch community is adapted to interface with a digital cellular site.

14. In a network comprising a plurality of packet switch communities, each of said packet switch communities having a plurality of endpoints connected to a common packet switch, each of said packet switch communities having a unique address and each of said endpoints in said packet switch communities having an address unique within its packet switch community, a method for connectionlessly delivering packetized data from a source endpoint to a destination endpoint, said packetized data having a destination address comprising a first field representing a packet switch community and a second field representing a destination endpoint address within that packet switch community, said method comprising the steps of:

said source endpoint sending said packetized data into a packet community of said source endpoint;

an interface endpoint at said packet switch community of said source responsive to said first field being different from an address of the packet community of said source delivering said packetized data to a switching means;

said switching means responsive to said first field delivering said packetized data to a packet switch community identified by said first field; and     an endpoint identified by said second field at said packet switch community identified by said first field receiving said packetized data from said switching means.

15. A method according to claim 14 wherein said step of delivering said packetized data to a packet switch community identified by said first field comprises:

encapsulating said packetized data into a form for transport on said switching means;

translating said first field of said destination address into a form recognized by said switching means; and     restoring said packetized data by said endpoint at said packet switch community identified by said first field.

16. A system for conveying packetized data from a first switching system to a second switching system, said first and second switching systems connected to a telephone network, said system comprising:

an asynchronous transfer mode network;

a first packet switch at said first switching system connected to said asynchronous transfer mode network, said first packet switch having a first packet bus, a first packet switch-to-asynchronous transfer mode interface connected to said first packet bus and to said asynchronous transfer mode network, and one or more sources for packet traffic connected to said first switching system; and a second packet switch at said second switching system connected to said asynchronous transfer mode network, said second packet switch having a second packet bus, a second packet switch-to-asynchronous transfer mode interface connected to said second packet bus and to said asynchronous transfer mode network, and one or more destinations for packet traffic connected to said second switching system, whereby said first switching system may send information to said second switching system via said first and second packet switches and said asynchronous transfer mode network without affecting said telephone network.

17. A method of conveying packetized data from a first switching system to a second switching system, said first and second switching systems connected to a telephone network and to an ATM network, said method comprising the steps of:

said first switching system delivering packetized data to a first packet switch at said first switching system, said first packet switch having a packet bus, at least one connection from said first switching system and to said packet bus, and a packet switch-to ATM interface connected to said packet bus and to said ATM network;

said first packet switch receiving said packetized data, delivering it on said packet bus to said packet switch-to-ATM interface;

said packet switch-to-ATM interface segmenting said packetized data, encapsulating said segments with ATM protocol, and sending said segments into said ATM network as ATM cells;

said second switching system receiving said packetized data at a second packet switch, said second packet switch having a packet bus, at least one connection to said second switching system and to said packet bus, and a packet switch-to-ATM interface connected to said packet bus and to said ATM network;

said packet switch receiving said ATM cells from said ATM network at said packet switch-to-ATM interface, removing said ATM protocol, reassembling said segment into packetized data, and sending said packetized data on said packet bus; and said connection receiving said packetized data from said packet bus and sending said data to said second switching system.

18. A system for delivering packetized data from a first switch to a second switch, said packetized data having an address, said system comprising:

means for receiving said packets in said first switch;

a packet switch in said first switch connected to said receiving means for transporting said packets;

first interface means responsive to said address of said packet for taking said packet from said packet switch and delivering said packet to an asynchronous transfer mode network;

second interface means at said second switch responsive to receipt of said packet from said asynchronous transfer mode network for putting said packet on a second packet switch;

destination means at said second switch connected to said packet switch responsive to said address of said packet for taking said packet from said second packet switch.

19. In a network comprising a plurality of packet switch communities, each of said packet switch communities having a plurality of endpoints connected to a common packet switch, each of said packet switch communities having a unique address and each of said endpoints in said packet switch communities having an address unique within its packet switch community, a system for connectionlessly delivering packetized data from one endpoint to another endpoint, said packetized data having a destination address comprising a first field representing a packet switch community address and a second field representing a destination endpoint address within that packet switch community, said system comprising:

means at said endpoints for sending said packets to their respective packet switch community;

means at a packet switch community responsive to said first field of said destination address for offering said packetized data to an interconnect means;

interconnect means for delivering said packetized data to a packet switch community identified by said first field;

means at said packet switch community identified by said first field for receiving said packetized data from said interconnect means and delivering said packetized data to said endpoints; and means at said endpoints responsive to said first and second address fields for accepting said packetized data, wherein only an endpoint in a packet switch community having an address corresponding to said first address field and having an address corresponding to said address in said second address field accepts said packetized data.

20. A system according to claim 19 wherein said means at a packet switch community responsive to said first field for offering said packetized data to an interconnect means includes means responsive to said first field being identical to said address of said packet community of said destination endpoint for delivering said packetized data to said interconnect means.

21. A system according to claim 19 wherein said interconnect means comprises a direct connection between a packet community of a source and a packet community of a destination wherein said interconnect means receives packetized data from said source packet switch community responsive to said first field of said destination address being identical to said address of said packet community of said destination and delivers said packetized data to said destination packet community.

22. A system according to claim 21 wherein said direct connection comprises an asynchronous transfer mode link.

23. A system according to claim 19 wherein said means at a packet switch community for offering said packetized data to an interconnect means includes a plurality of means at said source packet switch community responsive to said first field of said destination address being identical to a prespecified packet switch community.

24. A system according to claim 23 wherein said interconnect means further includes a plurality of direct connections, each of said direct connections connecting each of a plurality of means at a source packet switch community responsive to said first field of said destination address being identical to a prespecified packet switch community with a specific destination packet switch community for receiving said packetized data from said source packet switch community and delivering said packetized data to said destination packet switch community.

25. A system according to claim 19 wherein said means for offering said packetized data to said interconnect means comprises one of said plurality of endpoints.

26. A system according to claim 19 wherein said means for offering said packetized data to said interconnect means includes means for encapsulating said packetized data into a form suitable for said interconnect means, and said means for receiving said packetized data from said interconnect means includes means for restoring said packetized data.

27. A system according to claim 19 wherein said means at said packet switch community for offering said packetized data to said interconnect means includes addressing means for transforming said destination address into a network address.

28. A system according to claim 19 wherein said means at said endpoints for accepting said packetized data is responsive to said first field having an address corresponding to the address of its packet switch community when accepting packets from a different packet switch community, and responsive to said first field having a local address when accepting packets from its own packet switch community.

29. A system according to claim 19 wherein said means at said endpoints for accepting said packetized data is responsive to said first field having a local address, and wherein said receiving means translates said address in said first field into said local address.

30. A system according to claim 19 wherein said means at said endpoints for accepting said packetized data is responsive to said first field having a local address, and wherein said interconnect means translates said address in said first field into said local address.

31. A system according to claim 19 wherein said means at said endpoints for accepting said packetized data is responsive to said first field having a local address, and wherein said offering means translates said address in said first field into said local address.

32. A system according to claim 19 wherein said endpoints at at least one packet switch community is adapted to interface with a wireless system.

* * * * *